June 4, 1940.  E. KREISSIG ET AL  2,203,095
SPRING SYSTEM
Filed July 6, 1937  4 Sheets-Sheet 1
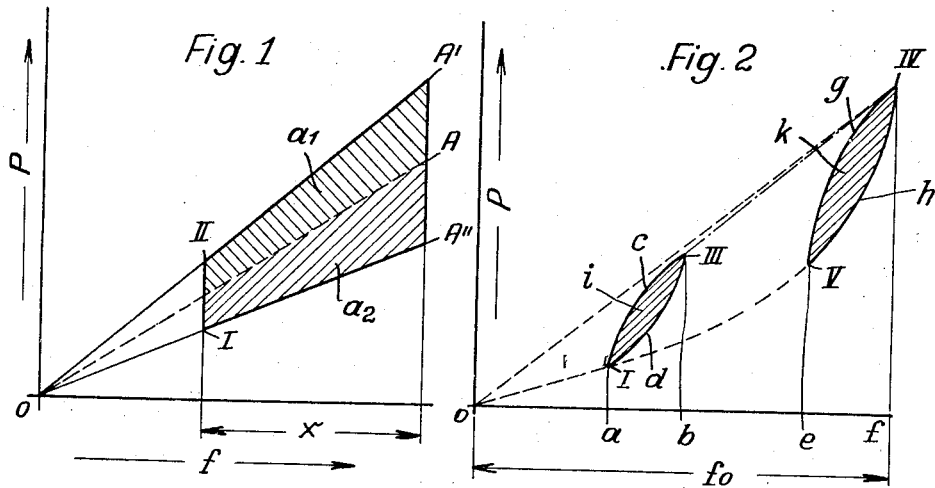
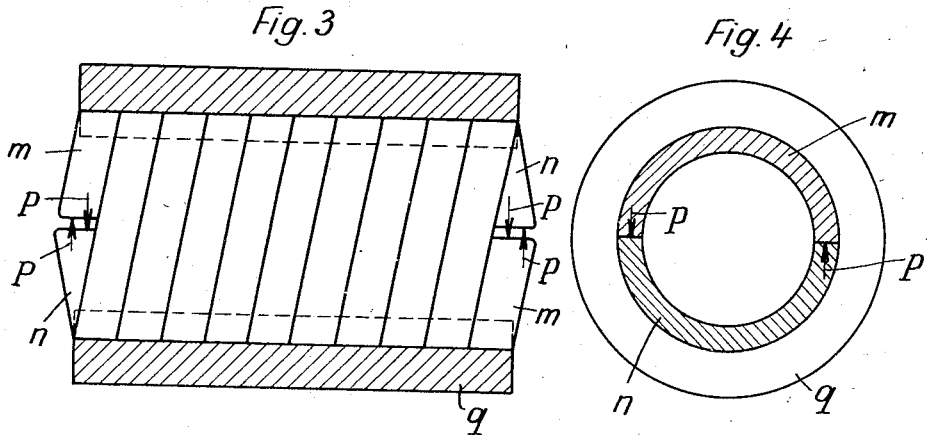
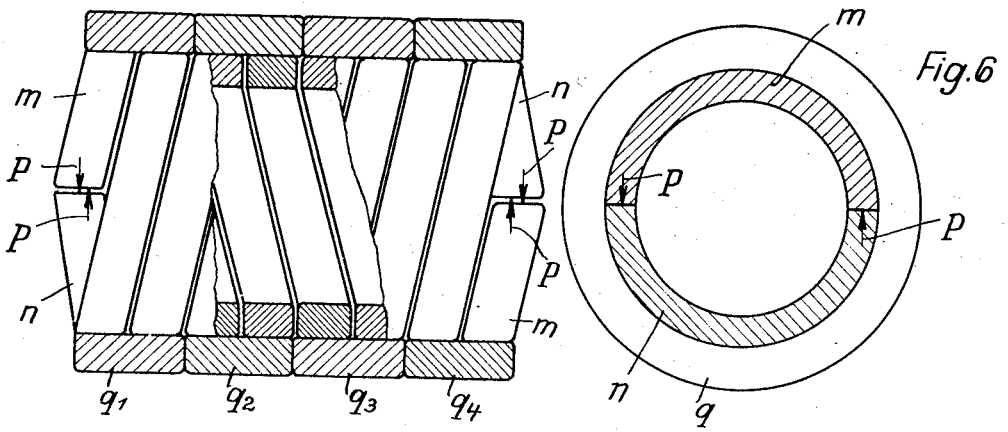
Ernst Kreissig
Franz Tönne
INVENTORS June 4, 1940.  E. KREISSIG ET AL  2,203,095
SPRING SYSTEM
Filed July 6, 1937   4 Sheets-Sheet 2

Ernst Kreissig
Franz Tönne
INVENTORS

By Otto Munk
their ATTY.

Ernst Kreissig
Franz Tönne
INVENTORS

June 4, 1940.  E. KREISSIG ET AL  2,203,095

SPRING SYSTEM

Filed July 6, 1937  4 Sheets-Sheet 4

Ernst Kreissig
Franz Tönne
INVENTORS

Patented June 4, 1940

2,203,095

UNITED STATES PATENT OFFICE 2,203,095

SPRING SYSTEM

Ernst Kreissig and Franz Tönne, Urdingen, Germany

Application July 6, 1937, Serial No. 152,216
In Germany July 4, 1936

21 Claims. (Cl. 267—58)

(Granted under the provisions of sec. 14, act of March 2, 1927; 357 O. G. 5)

This invention relates to spring systems, more particularly to road, wheel or bearing springs for vehicles.

Various forms of wheel springs for vehicles are already known. The known forms of springs partly work without any damping, such as for instance helical, coil or spiral springs and partly are damped, this damping acting, however, in an undesirable form. For instance, in the laminated leaf springs composed of several layers, which are widely used as a bearing spring or axle spring for vehicles, friction is set up by the springing movement between the single spring layers, this friction damping the springing effect so much that shocks or thrusts are produced. Moreover, the damping effect of these springs is not sufficient for efficiently damping the spring systems used in vehicles for traffic on rough roads. Therefore it is usual to provide additional damping devices, so-called shock- or thrust-absorbers. Springs for vehicles having no friction, such as spiral springs can be used only in connection with shock-absorbers.

Our present invention has for its object to obviate these disadvantages. According to a feature of this invention the spring consists of one or more coil shaped, helically or spirally wound spring strips, the exterior circumference of which engages the interior wall of a suitable casing, preferably of a cylindrical, closed form. Under action of the weight of the vehicle and of the shocks the springs are elastically compressed in a tangential direction. The amount of spring action of such a spring strip depends on its compression in a tangential direction. Since the spring strip lies against the interior wall of its casing as soon as it is loaded, only pressure stresses can occur in the spring strips. This is a very favourable manner of tressing the spring not possible with the types of springs so far used for vehicles. The stresses in the known springs were composite stresses in all cases, such as bending or torsion. These irregular stresses unlike pure pressure stress did not permit of a full utilization of the spring material. The spring strip according to our invention is exposed to pure pressure stresses only and therefore hardly shows fatigue effects, since the material used for springs is less sensible for these stresses than for tensile stress.

In order to maintain the weight of such a spring as low as possible it is advantageous to utilize the casing of the spring strip also for the spring effect, by elastically deforming it. By subdividing the casing into a plurality of separate rings it is possible to utilize the material more efficiently and to change the amount of damping very considerably. The damping effect can also be adjusted by suitably forming the inner circumference of the casing against which the spring strip lies and slides tangentially in the spring movement. The stress of the spring strip is different at different points along the strip in view of the circumferential friction, therefore it is advantageous to form the spring strip with gradually varying cross sections in such a manner that the stress is substantially equal in the various cross section.

The invention will be better understood by reference to the following detailed description in connection with the accompanying drawings, showing by way of example and schematically some embodiments of the invention, viz.—

Figure 1 is a diagram showing the characteristics of a laminated plate spring.

Figure 2 is a diagram showing the characteristics of a spring according to this invention.

Figure 3 is an axial section of an embodiment comprising two helical spring strips, wound into one another and an undivided casing, the latter shown in an axial section.

Figure 4 is an end view on the left hand side of Figure 3, the ends of the two helical spring strips being shown in section.

Figure 5 shows schematically an axial section of another embodiment, corresponding in its arrangement to Figure 3, but comprising a casing composed of a plurality of separate rings; the spring strips are only partly shown in section.

Figure 6 is an end view on the left hand side of Figure 5, the ends of the two helical spring strips shown in section.

Figure 12 is a cross section on the line A—A of Figure 13, Figure 13 is an axial section on the line B—B of Figure 12.

Figure 7:
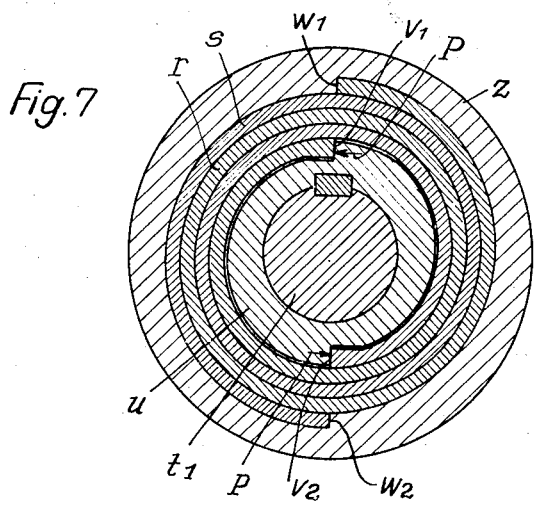
Figure 7 is a cross section of an embodiment comprising two spring strips wound spirally into one another.

Referring now to the drawings and first to Figure 1, the abcissa indicates the spring movement $f$ and the ordinate represents the force P acting upon the spring. The dotted line O—A shown in this figure represents the work due to elastic deformation, produced by a laminated plate spring as it is used for bearing springs. The friction prevailing between the single layers is represented by the hatched areas $a_1$ and $a_2$ above and below the line O—A. The actual characteristics of the spring action are indicated by the two full lines O—A' and O—A". For example, if the spring would have to carry a static load I, it follows from the diagram that with each shock impulse the spring force first increases from I to II, with no movement of the spring. This increase of the force acts like a shock and is known as a "damping shock" or "friction shock," by which the undesirable "damping oscillations" which are also sometimes referred to as "friction oscillations," are produced. This is a great disadvantage of the known plate springs. Moreover, the damping or friction represented by the hatched areas $a_1$ and $a_2$ are not sufficient for the spring action so that additional damping means are required in order to achieve an efficient spring effect.

The characteristics of our novel spring system are represented in Figure 2 in which the abcissa and the ordinate indicate the spring movement $f$ and the force P the same as in Figure 1. The working area, limited above by the dotted line O—IV, represents the maximum working capacity of our spring system. In order to analyze the operation of our spring system, a portion of the diagram, for example the portion $a$—$b$ of the diagram may be considered. Point I again corresponds to the static load acting on the spring, corresponding to a tension or compression of the spring represented by the amount $o$—$a$. Now, if a shock occurs, the spring is compressed, corresponding to the line $c$, up to the point III, from which point it expands according to the line $d$ which terminates again in the starting point I. The circumscribed area $i$ indicates the amount of damping. If the static load is changed, for example in such a manner that a stationary load V exists, by which the spring is permanently compressed from $o$ to $e$, any shock will cause an additional tension and compression of the spring following the line $g$, for instance from $e$ to $f$. The relaxation follows the line $h$ and the relaxation line again terminates in the point V. Also in this case the circumscribed area $k$ indicates the amount of damping.

Now, since the line $c$ as well as any other ascending line, for instance line $g$ from point IV, must terminate in the end point of the diagram of the respective spring system, it follows that the spring constant is different for each static load, that is to say, the higher the static load is, the higher is the spring constant. This is a great advantage of our novel spring system, since a single spring is sufficient to render possible in a vehicle with variable load a smooth spring action with small load and a harder or stronger spring action with higher load. Due to the different characteristics of the compression and expansion forces, the damping $i$ results in case of the spring movement $a$—$b$ and the damping $k$ results in case of the spring movement $e$—$f$ or a corresponding damping for any other portion of the diagram. Contrary to the known spring systems any damping shock (friction shock) is avoided because the expansion lines always terminate in the starting point of the compression line, for instance line $d$ terminates in point I and line $h$ terminates in point V.

One form of our novel spring is represented schematically in Figure 3. The spring in this case consists of two helically wound spring strips accommodated in a cylindrical housing $q$. $m$, $n$, There are five turns of each of the two spring strips $m$ and $n$ contained in the casing $q$. As indicated in Figure 4, the member to be resiliently supported exerts a tangential pressure P, P upon the ends of the spring strips $m$ and $n$ which is counter-balanced by a counter-pressure P, P, acting upon the opposite ends of the spring strips, as shown in Figure 3. By action of the load P the spring strips are compressed tangentially, the amount of compression representing the spring movement. The rigid casing $q$ prevents the spring strips from adopting a larger diameter so that only pure pressure stress prevails in any spring strip cross-section $m$ and $n$. The amount of compression depends on the number of turns of the spring or on the length of the spring strip respectively, and on the friction between the spring strip and the casing. Although our spring system will work also with a single spring, we prefer to use two or more spring strips, since in case of a plurality of points of attack of the force P a more uniform couple of forces or torque is obtained so that non-symmetrical pressures in the bearings are avoided.

According to a preferred form of our invention we produce the spring casing also of spring steel and make it with such dimensions that it is tangentially and radially elongated by the radial pressures of the spring strip. It is a matter of design for a man skilled in the art to construct the casing and spring strips in such a manner as to their dimensions that the strains in the casing $q$ which are pure tensile strains, remain in limits ensuring long duration of life on the one hand and that the desired deformation is obtained on the other hand. Therefore it is not necessary to indicate the required dimensions in this specification.

In the embodiment shown in Figures 5 and 6, the casing is subdivided into four annular parts $q_1$, $q_2$, $q_3$ and $q_4$. In this manner the stresses in the spring strips $m$ and $n$ are maintained approximately equal in all cross sections, whereby the material is utilized very efficiently. The single rings $q_1$, $q_2$, $q_3$, $q_4$ of the casings preferably cover only one turn of the spring each. The subdivision of the casing $q$ into single rings influences the damping also, so that the damping characteristic and the spring effect can be adjusted and controlled by a suitable subdivision of the casing. The end rings $q_1$ and $q_4$ may frictionally engage the opposite ends of the springs $m$ and $n$ and transmit at least a part of the forces upon the springs by this frictional engagement.

Figure 8:
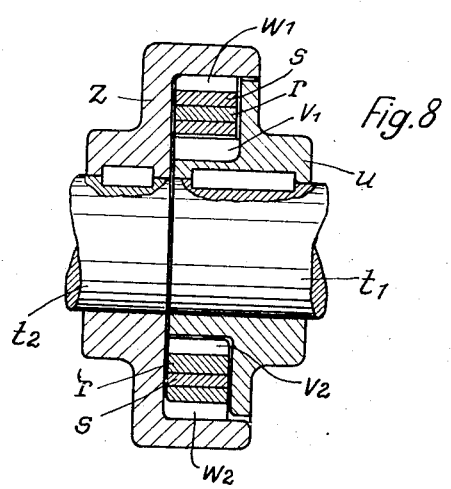
Figure 8 is an axial section of Figure 7.

In order to avoid excessive stresses at the ends of the springs we prefer to reinforce the spring strip at these points, for example in the manner represented in Figures 7 and 8, showing two spirally wound spring strips $r$ and $s$. The forces P are transmitted from the shaft $t_1$ through the hub $u$ which is provided with two projections $v_1$ and $v_2$, on the two spring strips $r$ and $s$. The spirally shaped spring strips $r$ and $s$ are wound into each other without interspaces so that the exterior circumference of each turn lies against the interior circumference of the adjacent turn while the two half turns at the exterior end engage projections $w_1$ and $w_2$ of the exterior casing $z$ which is rigidly mounted on the left hand shaft end $t_2$.

Figure 9:
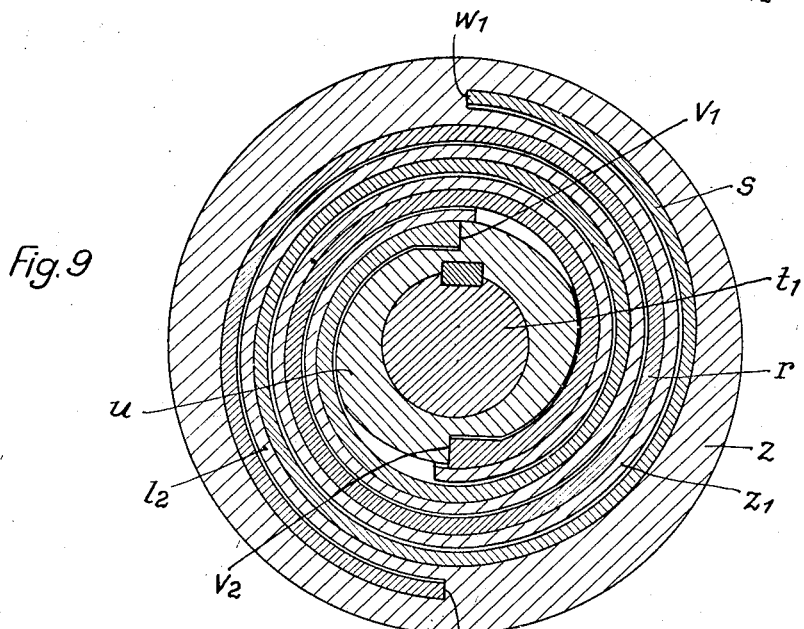
Figure 9 is a cross section of another embodiment comprising two spirally wound spring strips and spirally formed ribs in the casing.

Figure 9 also represents a spiral spring $r$, $s$ consisting of two spring strips wound into one another. The exterior casing $z$ is formed with spiral ribs or projections $z_1$, $z_2$, the interior circumference of which is engaged by the exterior circumference of the spring strips $r$ and $s$.

The cross section of the spirally wound spring strips $r$, $s$ may be reduced from the point of attack of the force, in the same manner as described with reference to the helically wound or coil strips represented in Figures 3 to 6, so that the specific stresses in the various cross sections of the whole spring strip are substantially equal.

Figure 10:
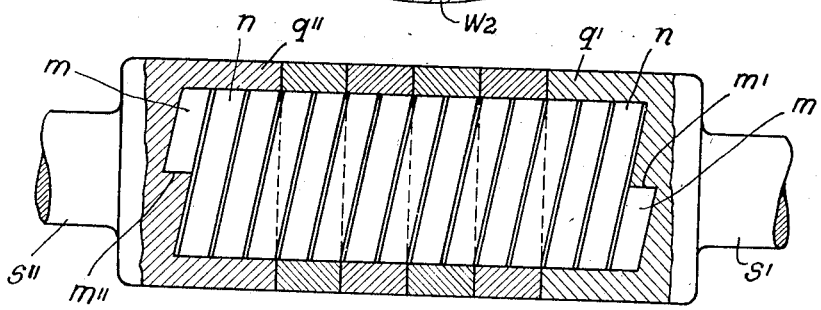
Figure 10 is a further embodiment, partly in an axial section, comprising two helically wound spring strips and a casing composed of a plurality of parts.
Figure 11:
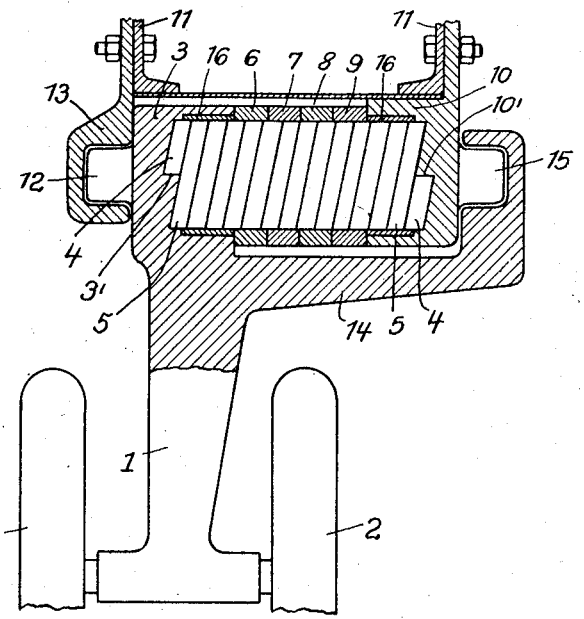
Figure 11 is a fragmentary view, partly in section, of a carriage or chassis of a road vehicle, embodying the invention.

In case of helically wound spring strips such as shown in Figures 5, 10 and 11, we prefer to transmit the tangential forces partially only upon the end faces of the springs, while the rest of the forces is transmitted by means of the friction between the spring or springs and the end caps or sleeves surrounding the springs. For instance, in Fig. 10, projections $m'$ and $m''$ engage the spring ends, while the rest of the torque which is to be resiliently transmitted from the shaft S' to the shaft S'' is transmitted by means of the frictional engagement between the springs $m$ and $n$ and sleeves $q'$ and $q''$ which extend over the ends of the springs and are connected with the shafts S' and S'' respectively. The springs $m$ and $n$ engage the two end sleeves $q'$ which serve simultaneously as transmitting members. When compressing the spring system, the strips $m$ and $n$ engage tightly the interior walls of the sleeves $q'$, so that the friction serves for transmitting the circumferential forces. Simultaneously these turns extending into the end sleeves $q'$ and $q''$ add to the spring effect of the system. It will be understood that the spring $n$ is acted upon by projections (not shown) corresponding to the projections $m'$ and $m''$ and being also arranged in the two sleeves $q'$ and $q''$ diametrally to the projections $m'$ and $m''$.

Our spring system is very useful also for bearing springs for the chassis of vehicles. A practical embodiment of this kind, showing a swing-lever spring system, is represented in Figure 11. The wheels 2 of the vehicle are mounted in bearings located in the free end of the lever arm 1. The inner end of the lever arm 1 is formed as a casing 3 in which the left hand end turns of two helically wound springs 4 and 5 are enclosed. Intermediate rings 6, 7, 8 and 9 are arranged coaxially with the bore of the casing 3 and enclose the middle turns of the springs 4 and 5. The turns at the right hand end of the springs 4 and 5 are enclosed in the casing 10 which is mounted in the chassis 11 of the vehicle and serves at the same time as a bearing. The casing 3 in turn is swingably mounted in the bearing 13 of the chassis frame by means of a pivot 12 so that it is free to swing in accordance with the angular twisting movement occurring with the compression of the springs 4 and 5. The swing-arm 1 is moreover supported by means of its portion 14 which is swingably mounted at the inner stationary casing 10 by means of a pivot 15. It will be understood that the spring 4 is acted upon by the projections 3' and 10' of the casings 3 and 10 respectively, while the spring 5 is acted upon by projections (not shown) which correspond to the projections 3' and 10' and are arranged diametrally thereto in the casings 3 and 10 respectively.

If the swing-lever 1 and the casing 3 integral therewith are made of cast steel or another steel which cannot be hardened sufficiently, a thin slotted or unslotted sleeve 16 may be forced into the casing 3. This sleeve 16 will engage the inner wall of the casing 3 under action of a radial pressure exerted by the springs 4 and 5 and thus effect a frictional connection between the sleeve 16 and the casing 3 and, if desired, between the sleeve 16 and the springs 4 and 5. An insertion of the kind exemplified by the sleeve 16 in Figure 11 is very advantageous, because the surfaces acted upon by the springs 4 and 5 require high mechanical strength and therefore have to be made of high-grade steel. By the insertion of a sleeve like item 16 in Figure 11 the necessity of making the whole swing member 1 of such high-grade steel is dispensed with.

Figure 12:
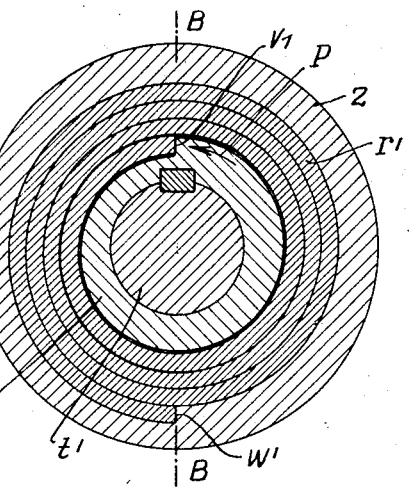
Figures 12 and 13 show a spring system similar to that illustrated in Figures 7 and 8, comprising, however, one spiral spring only.
Figure 13:
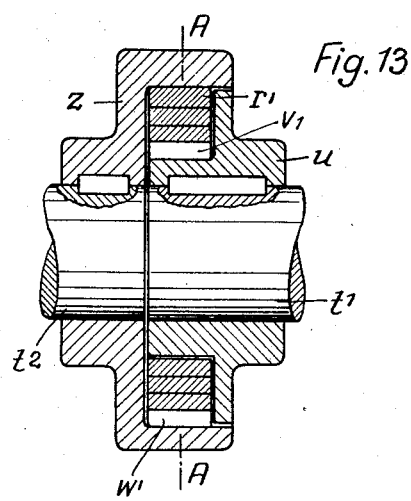

The spring system shown in Figures 12 and 13 corresponds to that shown in Figures 7 and 8 except that only one spiral spring is used in this case. In view of this similarity of the figures, the same reference numerals have been used for identical items in Figures 12 and 13 so that a more detailed description of these figures will be unnecessary.

Figure 14:
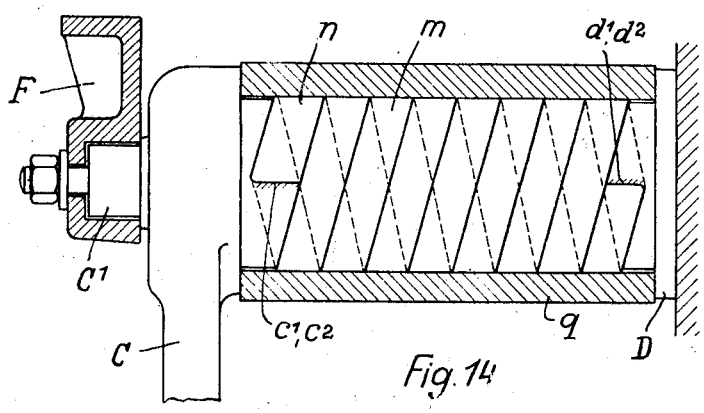
Figure 14 is a side view, partly in an axial section, of a practical form of construction of the spring system shown in Figure 3.

In Figure 14, a practical embodiment of the system shown schematically in Figure 3 has been illustrated. Two helically wound spring strips $m$, $n$ are mounted in an undivided casing $q$ and are stressed, by means of the swinging lever C, in a direction of tangential pressure. The free end of the lever C may carry a wheel in the same manner as shown in Figure 11. The right hand ends of the spring strips $m$ and $n$ act upon the stationary support D forming a part of the chassis of the vehicle (not shown), through the diametrally positioned projections $d_1$ and $d_2$ thereof, while the left hand ends of the springs $m$ and $n$ act upon the diametrally positioned projections $c_1$, $c_2$ of the swinging lever C which in turn is swingably mounted, by means of pivot $C_1$, in the bearing F which is also fixedly mounted at the chassis of the vehicle (not shown).

In a spring system with an undivided casing the stresses in the cross section of the spring strip decrease starting from the points of attack of the forces towards the middle of the casing, depending on the coefficient of friction. Hence, we contemplate to reduce the cross section towards the middle of the spring strip in accordance with the decrease of the stress. In view of the friction between casing and springs, the casing $q$ may also be formed with a varying wall thickness in such a manner that the casing is substantially uniformly stressed.

Figure 15:
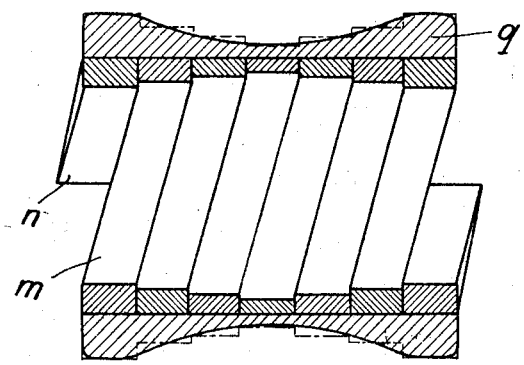
Figure 15 is an axial section of a spring system in accordance with Figure 3, comprising, however, two springs and a casing reduced in thickness towards the middle.

Figure 15 is a practical embodiment of this kind, comprising two helically wound spring strips $n$ and $m$ which are gradually reduced or tapered in their radial thickness and thus adapted to the decreasing stresses. It will be clear that instead of reducing the radial thickness, it is also possible to reduce the axial width of the spring strip or both. The casing $q$ is also reduced in wall thickness towards the middle. The dotted lines in Figure 16 are merely intended to illustrate the geometrical construction of the form of the wall of casing $q$.

It will be understood that the two features, that is to say variable cross section of the spring strips and variable wall thickness of the casing may be used either separately or combined.

We contemplate also to use our spring system in combination with other, undamped springs as a damping organ. For instance, such a combination may be used in order to achieve a very soft spring effect or power transmission. The ascent of the force represented by the lines $c$ or $g$ in Figure 2 may be made more gradual in such cases so that a smaller spring constant results for the loads I or V. To this end, we may associate an undamped spring with the damped spring system according to our invention, in such a manner that the spring movement and the spring action are partly due to the damped spring and partly to the undamped spring arranged in series with each other. The damping and the spring constant in this case depend on the characteristics of the two spring systems which are combined with each other and these data can be modified accordingly. A combined spring system of this kind offers the advantage that oscillations of high frequency and small amplitude due to their short time of oscillation are received by the undamped spring only, while oscillations of larger amplitude are received by combined action of both spring systems. This is desirable in many cases, because small oscillations are not dangerous unless resonance effects are produced. If so, on the other hand, the damped spring system is set to operating and works in the aforedescribed manner, damping the resonance effects.

Figure 16:
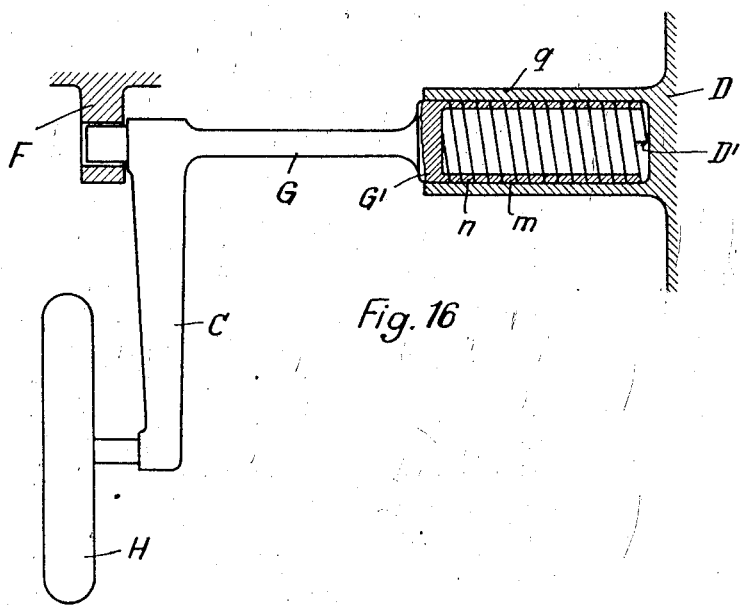
Figure 16 is a fragmentary and schematical view, partly in an axial section, of a wheel bearing system embodying a spring system according to our invention, combined with an undamped spring in series arrangement.

A combined spring system of the kind described is illustrated in Figure 16, representing a system of helical springs $n$, $m$ associated with a torsional spring G. The torsion spring G is formed coaxially with the pivot of a swing-lever C, at the free end of which a wheel H is mounted. The pivot lever C is swingably mounted in a bearing F attached to the chassis of the vehicle. The right hand end of the spring rod G is formed with a short cylindrical sleeve G' which is guided in the spring casing $q$. In the casing $q$ there are enclosed helical springs $n$ and $m$ acted upon by projections of the sleeve G' and casing $q$, as at D', in the same manner as hereinbefore described with reference to Figures 10 and 11. The casing $q$ is connected with the chassis by means of its base D in any suitable manner (not shown).

Figure 17:
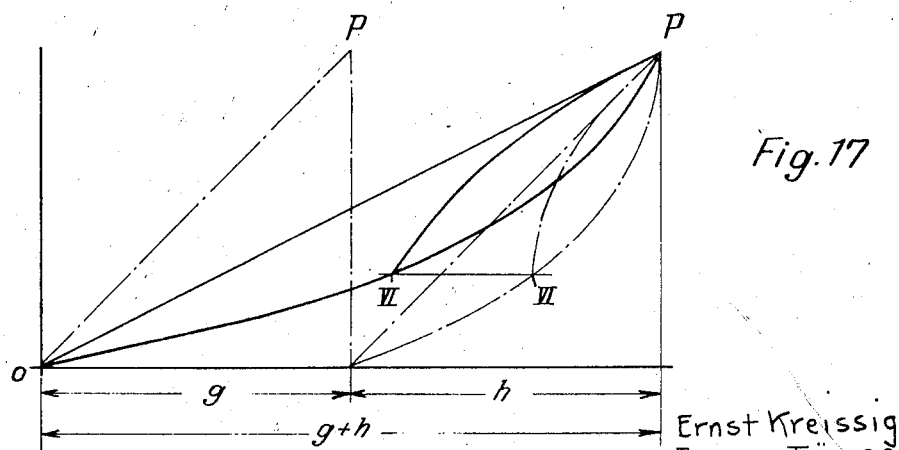
Figure 17 is a diagram of the working characteristics of the system shown in Figure 16.

The characteristics of a combined spring system of the kind shown in Figure 16 are shown in Figure 17. The abcissa of this diagram indicates the spring movement and the ordinate indicates the force P acting upon the spring. The part $g$ of the diagram (dotted lines) represents the characteristics of the undamped spring G, while the part $h$ of the diagram (dotted lines) represents the characteristics of the damped spring system $m$, $n$. The diagram resulting by a combination of the two spring systems is represented by the full lines. It will be seen that in case of a static load VI the spring forces increase more gradually if they are received by the combined spring system than if they are received by the damped spring system alone. A similar favourable condition results with any other static load of the asociate springs G and $m$, $n$.

It will be understood that instead of the torsion spring G any other undamped spring system such as a helical spring may be used in combination with the spring system according to our invention. We contemplate to use our spring system for other purposes except as bearing springs for vehicles, as well. Generally, it can be used in any devices for transmitting forces and for absorbing thrusts by means of damped springs which in particular are required to return to their initial position on relaxation and to effect the necessary damping without producing initial friction before yielding the shock impulse. Examples of such devices by which the scope of the invention is in no way restricted, however, are devices in vehicles exposed to pull- and push-action, spring systems for the carriage of airplanes and the like.

While we have herein shown and described certain preferred embodiments of our invention, we wish it to be understood that we do not confine ourselves to all the precise details herein set forth by way of illustration, as modification and variation may be made without departing from the spirit of the invention or exceeding the scope of the appended claims.

Having thus described the invention what is claimed is:

1. In a spring system, a coil spring adapted to be compressed in a tangential direction, at least one closed ring frictionally engaging the outer circumference of said spring, means adapted to transmit pressure forces to one end face of said spring in a tangential direction and means adapted to transmit counter-pressure forces to the opposite end face of said spring in a tangential direction, whereby the spring is substantially exposed to pressure stresses only and elastically deformed substantially in its tangential direction only.

2. In a spring system, a helically wound spring adapted to be compressed in a tangential direction, at least one closed ring frictionally engaging the outer circumference of said spring strip, means adapted to transmit pressure forces to one end face of said spring strip in a tangential direction and means adapted to transmit counter pressure forces to the opposite end face of said spring strip in a tangential direction, whereby the spring strip is substantially exposed to pressure stresses only and elastically deformed substantially in its tangential direction only.

3. In a spring system, a spirally wound spring strip adapted to be compressed in a tangential direction, a closed ring frictionally engaging the outer circumference of said spring strip and adapted to prevent increase of the diameter of said spring strip, means adapted to transmit forces to one end face of said spring strip in a tangential direction and means adapted to transmit counter-forces to the opposite end face of said spring strip in a tangential direction, whereby the spring strip is substantially exposed to pressure stresses only and elastically deformed substantially in its tangential direction only.

4. In a spring system, a plurality of spring strips helically wound into each other and adapted to be compressed in a tangential direction, a closed ring engaging the outer circumference of said spring strips and adapted to prevent increase of the diameter of said spring strips, means adapted to transmit forces to one end face of said spring strips in a tangential direction and means adapted to transmit counter-forces to the opposite end face of said spring strips in a tangential direction, whereby the springs are substantially exposed to pressure stresses only and elastically deformed substantially in their tangential direction only.

5. In a spring system, a plurality of spring strips spirally wound into each other and adapted to be compressed in a tangential direction, a closed ring engaging the outer circumference of said spring strips and adapted to prevent increase of the diameter of said spring strips, means adapted to transmit forces to one end face of said spring strips in a tangential direction and means adapted to transmit counter-forces to the opposite end face of said spring strips in a tangential direction, whereby the springs are substantially exposed to pressure stresses only and elastically deformed substantially in their tangential direction only.

6. In a spring system, a coiled spring strip adapted to be compressed in a tangential direction and a casing in the form of a closed ring enclosing and frictionally engaging the outer circumference of said spring strip, adapted to prevent increase of the diameter of said spring strip and to transmit forces to one end face of said spring strip in a tangential direction and a swinging member adapted to transmit counter-forces to the opposite end face of said spring strip in a tangential direction, whereby the spring is exposed substantially to pressure stresses only and elastically deformed substantially in its tangential direction only.

7. In a spring system, a helically wound spring strip adapted to be compressed in a tangential direction, a cap enclosing the end turns at one end of said spring strip and a cap enclosing the end turns at the opposite end of said spring strip and closed rings enclosing the middle turns of said spring strip, said caps and said rings adapted to prevent increase of the diameter of said spring strip and means at said caps adapted to transmit forces to the end portions of said spring strip in a tangential direction, whereby the spring is exposed substantially to pressure stresses only and elastically deformed substantially in its tangential direction only.

8. In a spring system, a casing in the form of a closed ring including spirally shaped grooves, a plurality of spring strips wound into each other, accommodate in said spiral grooves and engaging by their outer circumference the inner circumference of said grooves, projections at said casing adapted to transmit forces to one end face of said spring strips in a tangential direction and a swinging member adapted to transmit counter-forces to the opposite end face of said spring strips in a tangential direction, whereby the spring strips are exposed substantially to pressure stresses only and elastically deformed substantially in their tangential direction only.

9. In a spring system, a helically wound spring strip adapted to be compressed in a tangential direction and at least one closed ring enclosing and engaging the outer circumference of said spring strips and adapted to be elastically expanded in diameter by tangential forces acting upon said spring strip, means adapted to transmit forces to one end face of said spring strip in a tangential direction and means adapted to transmit counter-forces to the opposite end face of said spring strip in a tangential direction.

10. In a spring system, a spirally wound spring strip adapted to be compressed in a tangential direction and a closed ring enclosing and engaging the outer circumference of said spring strip and adapted to be elastically expanded in diameter by tangential forces acting upon said spring strip, means adapted to transmit forces to one end face of said spring strip in a tangential direction and means adapted to transmit counter-forces to the opposite end face of said spring strip in a tangential direction.

11. In a spring system, a wound spring strip adapted to be compressed in a tangential direction, at least one closed ring frictionally engaging the outer circumference of said spring strip and adapted to prevent increase of the diameter of said spring strip, means adapted to transmit forces to one end face of said spring strip in a tangential direction and means adapted to transmit counter-forces to the opposite end face of said spring strip in a tangential direction, said spring strip being reduced in cross section from both ends towards the middle to such a degree that the specific pressure stresses acting upon the various cross sections of the spring strip are substantially equal.

12. In a spring system, a helical spring strip adapted to be compressed in a tangential direction and a casing in the form of a closed ring enclosing and frictionally engaging the outer circumference of said spring strip and adapted to transmit forces to one end face of said spring strip in a tangential direction and a swinging member adapted to transmit counter-forces to the opposite end face of said spring strip in a tangential direction, said casing being reduced in wall thickness towards the points where the middle turns of the said spring strip engage its walls, in such a manner that the said walls are substantially uniformly stressed by said spring strip.

13. In a spring system, a helically wound spring strip, a swingably arranged member in the form of a closed ring enclosing and frictionally engaging the outer circumference of the turns at one end of said spring strip and adapted to transmit forces to said spring strip in a tangential direction by the frictional engagement between said spring strip and said swinging member, and a second swingably arranged member in the form of a closed ring enclosing and frictionally engaging the outer circumference of the turns at the opposite end of said spring strip and adapted to transmit counter-forces to said spring in a tangential direction by the frictional engagement between said spring strip and said second swinging member, whereby the spring strip is exposed substantially to pressure stresses only and elastically deformed substantially in its tangential direction only.

14. In a spring system, in combination, a damped spring unit comprising at least one wound spring strip adapted to be compressed in a tangential direction, means comprising at least one closed ring enclosing and frictionally engaging the outer circumference of said spring strip and adapted to prevent increase of the diameter of said spring strip, means adapted to transmit forces to one end face of said spring strip in a tangential direction and means adapted to transmit counterforces to the opposite end face of said spring strip in a tangential direction, and an undamped spring unit connected in series with said damped spring unit.

15. In a springing system, in combination, a damped spring unit comprising at least one wound spring strip adapted to be compressed in a tangential direction, means comprising at least one closed ring enclosing and frictionally engaging the outer circumference of said spring strip and adapted to prevent increase of the diameter of said spring strips, a swingably mounted member adapted to transmit forces to one end face of said spring strip in a tangential direction and a stationary member adapted to transmit counter-forces to the opposite end face of said spring strip in a tangential direction, and an undamped spring unit, comprising a torsional spring rod coaxially arranged and connected with said swingable member.

16. In a springing system for vehicles, a wound spring strip adapted to be compressed in a tangential direction, means comprising at least one closed ring enclosing and frictionally engaging the outer circumference of said spring strip and adapted to prevent increase of the diameter of said spring strip, a lever swingably mounted at the stationary part of the vehicle and connected at its free end to means exposed to the shocks of the road, means adapted to transmit forces from said lever to one end face of said spring strip in a tangential direction, and a member fixedly mounted at the stationary part of the vehicle and adapted to transmit counter-forces to the opposite end face of said spring strip in a tangential direction, whereby the spring strip is exposed substantially to pressure stresses only and elastically deformed substantially in its tangential direction only by swinging movements and thrusts transferred from the road through said lever and said transmitting means.

17. In a spring system, a coiled spring strip having end faces positioned at opposite ends of the strip, means counteracting radial expansion of said spring, means adapted to transmit pressure forces to one end face of said spring in a tangential direction and means adapted to transmit counter-pressure forces to the opposite end face of said spring in a tangential direction, said first means being arranged in such a manner with respect to said force transmitting means that the first means are not contracted by action of said forces, whereby the spring is substantially exposed to tangential pressure stresses only and elastically deformed substantially in its tangential direction only.

18. In a spring system, a helically wound spring strip adapted to be compressed in a tangential direction and a casing forming in substantially all cross sections normal to its axial length non-interrupted, closed rings of material for frictionally engaging the outer circumference of said spring and producing substantially tensile stresses only in a circumferential direction of said elementary closed rings in case of radial expansion of said spring, said casing adapted to prevent increase of the diameter of said spring strip and to transmit forces to one end face of said spring strip in a tangential direction and a swinging member adapted to transmit counter-forces to the opposite end face of said spring strip in a tangential direction, whereby the spring strip is exposed substantially to pressure stresses only and elastically deformed substantially in its tangential direction only.

19. In a spring system, a spirally wound spring strip adapted to be compressed in a tangential direction and a casing member forming in substantially all cross sections normal to its axial length non-interrupted, closed rings of material for frictionally engaging the outer circumference of said spring and producing substantially tensile stresses only in a circumferential direction of said elementary closed rings in case of radial expansion of said spring, said casing adapted to be elastically expanded in diameter by tangential forces acting upon said spring strip, means adapted to transmit forces to one end face of said spring strip in a tangential direction and means adapted to transmit counter-forces to the opposite end face of said spring strip in a tangential direction, whereby the spring strip is exposed substantially to pressure stresses only and elastically deformed substantially in its tangential direction only.

20. In a spring system, a coil spring adapted to be compressed in a tangential direction, at least one casing member forming in substantially all cross sections normal to its axial length non-interrupted, closed rings of material for frictionally engaging the outer circumference of said spring and producing substantialy tensile stresses only in a circumferential direction of said elementary closed rings in case of radial expansion of said coil spring, means adapted to transmit pressure forces to one end face of said spring in a tangential direction and means adapted to transmit counter-pressure forces to the opposite end face of said spring in a tangential direction, whereby the spring strip is exposed substantially to pressure stresses only and elastically deformed substantially in its tangential direction only.

21. In a spring system, a helically wound spring adapted to be compressed in a tangential direction, at least one casing member forming in substantially all cross sections normal to its axial length non-interrupted, closed rings of material for frictionally engaging the outer circumference of said spring and producing substantially tensile stresses only in a circumferential direction of said elementary closed rings in case of radial expansion of said spring, means adapted to transmit pressure forces to one end face of said spring strip in a tangential direction and means adapted to transmit counter pressure forces to the opposite end face of said spring strip in a tangential direction, whereby the spring strip is exposed substantially to pressure stresses only and elastically deformed substantially in its tangential direction only.

ERNST KREISSIG.
FRANZ TÖNNE.